United States Patent [19]
Palmer

[11] Patent Number: 5,840,794
[45] Date of Patent: Nov. 24, 1998

[54] ALKOXY FUNCTIONAL SEALANTS WITH RAPID DEVELOPMENT OF GREEN STRENGTH

[75] Inventor: Richard Alan Palmer, Midland, Mich.

[73] Assignee: Dow Corning Corporation, Midland, Mich.

[21] Appl. No.: 916,165

[22] Filed: Aug. 21, 1997

Related U.S. Application Data

[63] Continuation-in-part of Ser. No. 781,340, Jan. 10, 1997, abandoned.

[51] Int. Cl.$^6$ ................................................ C08G 77/08
[52] U.S. Cl. .......................... 524/425; 524/588; 524/492; 528/17
[58] Field of Search ..................... 524/425, 492, 524/588; 528/17

[56] References Cited

U.S. PATENT DOCUMENTS

| | | | |
|---|---|---|---|
| 4,387,177 | 6/1983 | Mine et al. | 524/425 |
| 4,525,565 | 6/1985 | Laisney et al. | 528/17 |
| 4,525,566 | 6/1985 | Homan et al. | 528/17 |
| 4,530,882 | 7/1985 | Homan et al. | 428/452 |
| 4,585,705 | 4/1986 | Broderick et al. | 428/447 |
| 4,681,908 | 7/1987 | Broderick et al. | 524/268 |
| 4,743,474 | 5/1988 | Homan | 427/387 |
| 4,871,827 | 10/1989 | Klosowski et al. | 528/17 |
| 4,888,404 | 12/1989 | Klosowski et al. | 528/15 |
| 5,246,980 | 9/1993 | Palmer | 523/200 |
| 5,266,631 | 11/1993 | Arai et al. | 524/847 |
| 5,286,766 | 2/1994 | Arai et al. | 523/213 |
| 5,733,996 | 3/1998 | De Buyl et al. | 528/17 |

FOREIGN PATENT DOCUMENTS

| | | | |
|---|---|---|---|
| 0735101 | 10/1996 | European Pat. Off. | 83/4 |
| 735 101 | 10/1996 | European Pat. Off. . | |
| 0747443 | 12/1996 | European Pat. Off. | 83/4 |
| 747 443 A2 | 12/1996 | European Pat. Off. . | |

*Primary Examiner*—Margaret W. Glass
*Attorney, Agent, or Firm*—Roger H. Borrousch

[57] ABSTRACT

An RTV sealant composition of a polymer with silicon-containing endgroups with at least two silicon-bonded alkoxy groups, a titanium catalyst of the formula

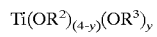

$$\text{Ti}(OR^2)_{(4-y)}(OR^3)_y$$

where each $R^2$ is a monovalent tertiary aliphatic hydrocarbon radical and a monovalent branched-secondary aliphatic hydrocarbon radical, each $R^3$ is a monovalent linear aliphatic hydrocarbon radical having from 1 to 6 carbon atoms per radical, y has an average value of from 0 to 1 inclusive, a filler, and an alkoxysilane having at least two silicon-bonded alkoxy groups. These sealant compositions exhibit a rapid formation of green strength, cure rapidly, and do not yellow or discolor.

20 Claims, No Drawings

ALKOXY FUNCTIONAL SEALANTS WITH RAPID DEVELOPMENT OF GREEN STRENGTH

This is a continuation-in-part of Ser. No. 08/781,340, filed Jan. 10, 1997, now abandoned.

BACKGROUND OF THE INVENTION

1. Field of the Invention

This invention relates to a moisture curable, room-temperature-curable (RTV) composition containing silicon-bonded alkoxy functionality and a titanium catalyst.

2. Background Information

Organopolysiloxane compositions which cure to elastomeric materials at room temperature are well known. Such compositions can be obtained by mixing a polydiorganosiloxane having reactive groups, such as silanol groups, with a silane cross-linking agent for the polydiorganosiloxane, for example, an alkoxy silane, an acetoxy silane, an oximo silane, or an amino silane. Compositions such as these can be cured by exposure to atmospheric moisture at room temperature and depending upon the particular ingredients and their amounts, can be either stored in a container which protects the composition from moisture and then cured upon exposure to moisture (a one-package composition) or the ingredients can be stored in two or more containers which are then mixed and cure begins immediately upon mixing (a two-package composition).

Moisture curable compositions are well known for their use as sealants. It is important that the sealant compositions are capable of curing in comparatively thick layers (sometimes call thick section), such as providing an elastomeric body with a thickness of greater than two millimeters (mm). Many of these sealant compositions preferably cure quickly enough to provide a seal within several hours, but not so quickly that the surface cannot be tooled to a desired configuration shortly after application of the sealant composition. Among the desirable attributes for such compositions are: fast surface cure rate, good elasticity of the skin formed and lack of surface tackiness after curing for about 24 hours. For some applications, it is desirable to have a clear, translucent or "water white" product which retains its translucency and lack of color during use.

In order to increase the speed of cure of alkoxy silane containing silicone compositions, it has become a practice to employ certain organic titanium compounds as catalysts for the hydrolysis and condensation reaction. Some of these titanium compounds are apt to react with methoxysilane to form a white precipitate in compositions containing them and this gives a discoloration and restricts the ability of the composition to cure. Also, the titanium compounds most generally preferred for this purpose are those derived from primary or secondary alcohols, for example, isopropyl alcohol and n-butyl alcohol. However, these titanium compounds are often inadequate to promote a sufficiently rapid and/or deep section cure and it is a practice to employ a chelating agent, such as acetylacetonate, as an accelerator and stabilizer for a titanium compound. The acetylacetonate may be mixed with the titanium compound or reacted with it to provide a complex. These materials containing acetylacetonate inevitably lead to a cured silicone product which has a yellow tint. A solution to the problem of yellowing has been sought for many years prior to the discovery by de Buyl et al that a certain restricted class of compounds of an element having a valency of 4 and selected from Group IVB of the Periodic Table (for example titanium), it has not been known how to achieve the characteristics of desired speed of cure together with non-yellowing when compositions contain silicon-bonded alkoxy functionality is the moisture reactive group. This restricted class of compounds of the IVB Group of the Periodic Table was discovered by de Buyl et al as described in pending U.S. Pat. application Ser. No. 08/657,505, filed Jun. 4, 1996, now U.S. Pat. No. 5,733,996, which is hereby incorporated by reference to describe the Group IVB compounds, their method of preparation, and their use in sealant formulations. With this class of Group IVB compounds, such as Ti, Zr, Hf, and Th, described by de Buyl et al, silicon-bonded alkoxy-functional containing, RTV compositions can be obtained which cure in the presence of atmospheric moisture at a desirable rate without the presence of acetylacetonate accelerator-stabilizer and also provide translucent, "water white" cured products. The compounds described by de Buyl et al have a general formula M[OR']$_a$[OR"]$_b$ where M represents a metal having a valence of 4 and is a metal selected from Group IVB of the Periodic Table, a has an average value of from 0 to 1 inclusive, b has an average value of from 3 to 4 inclusive, and a +b is 4, R" represents a monovalent, tertiary or branched-secondary aliphatic hydrocarbon group, and R' represents a monovalent linear aliphatic hydrocarbon group having from 1 to 6 inclusive carbon atoms.

According to de Buyl et al, it is important that R" be a bulky structure, i.e. tertiary or branched-secondary in order to minimize the tendency of the metal atom, M, to oligomerize via oxo bridge formation between metal atoms. A four-coordinated metallic compound can be maintained as a stable species towards hydrolysis and condensation reactions under mild hydrolysis conditions. This permits the avoidance of acetylacetonate as a ligand to stabilize a titanium ester catalyst, and also permits the avoidance of the yellowing discoloration, while enhancing the speed of cure. Preferably, there are several R" groups in each molecule of metal compound. Titanium is the preferred metal. The OR" group is derived from a tertiary or branched-secondary alcohol. Preferred R" are those represented by the general formula —CR$^6$R$^7$R$^8$ in which each R$^6$, R$^7$, and R$^8$ is a monovalent aliphatic hydrocarbon radical having from 1 to 6 inclusive carbon atoms per radical. The most preferred metallic compounds according to de Buyl et al are those in which a is 0 and b is 4, and all the R" groups are tertiary aliphatic groups. A preferred group of metallic compounds according to de Buyl et al are those represented by the general formula

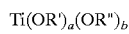

where R" is —C(CH$_3$)$_3$ or —C(C$_2$H$_5$)(CH$_3$)$_2$ and R' is isopropyl.

According to de Buyl et al, the above described metallic compounds are used in amount of from 0.2 to 10 parts by weight per 100 parts by weight of a polymeric material to be further described. The polymeric material is represented by the general formula X—A—X where A may be any desired organic or siloxane molecular chain, for example, a polyoxyalkylene chain or more preferably a polydiorganosiloxane chain which includes siloxane units R$^9_s$SiO$_{(4-s)/2}$ in which R$^9$ represents an alkyl radical of from 1 to 6 inclusive carbon atoms per radical, vinyl, phenyl, or a fluorinated alkyl radical, and s is 0, 1, or 2. The preferred linear polymeric materials are linear with units in which s is 2. These preferred linear polydiorganosiloxane chains are represented by the general formula —(R$^9_2$SiO)$_t$— in which each R$^9$ represents methyl and t has a value of from 200 to 1500. X of the polymeric material are silyl groups which contain silicon-bonded hydroxyl or alkoxy groups. These silyl groups are illustrated by

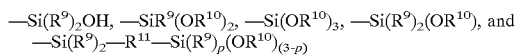

where $R^9$ is defined above and preferably is methyl, $R^{11}$ is a divalent hydrocarbon radical which may be interrupted by one or more siloxane spacers having up to six silicon atoms, $R^{10}$ is an alkyl or alkoxyalkyl in which the alkyl radical has from 1 to 6 carbon atoms and p is 0, 1, or 2.

According to de Buyl et al, the compositions in which a metallic compound is used, can also contain an alkoxysilane curative of the general formula $R^9_{(4-n)}Si(OR^{10})_n$ in which $R^9$ and $R^{10}$ are defined above and n is 2, 3, or 4. The preferred alkoxysilanes are those in which $R^9$ is methyl, ethyl, or vinyl, $R^{10}$ is methyl or ethyl and n is 3. Alkoxysilanes can be illustrated by methyltrimethoxysilane, vinyltrimethoxysilane, methyltriethoxysilane, and vinyltriethoxysilane. A sufficient amount of the alkoxysilane is employed to ensure adequate stability of the composition during storage and adequate crosslinking of the composition when exposed to atmospheric moisture.

According to de Buyl et al, the preferred compositions are those using the preferred catalyst materials (metallic compound) containing no co-catalyst and no chelating agent, and cure at an acceptably fast rate and give cured translucent or water white elastomeric reaction products in thicknesses greater than 2 mm. If a more rapid cure is desired, a chelate, for example acetylacetonate, may be added to the mixture. Acetylacetonate is used as an accelerator and/or stabilizer, but leads to yellowing of the product.

Further, de Buyl et al state that their compositions can optionally contain other ingredients which are conventional to the formulation of silicone sealants. For example, these optional ingredients can be finely divided fillers, such as reinforcing or extending fillers, illustrated by high surface area fumed and precipitated silica, crushed quartz, diatomaceous earth, calcium carbonate, barium sulfate, iron oxide, titanium dioxide, and carbon black. The proportion of such fillers employed will depend on the properties desired in the elastomer-forming composition and the cured elastomer. Usually, the filler content of the composition will be within the range from 5 to 150 parts by weight per 100 parts by weight of the polymeric material. Other ingredients may also be included, such as co-catalysts for increasing the rate of cure, pigments, plasticizers, agents (usually organosilicon compounds) for treating fillers, rheological additives for improving toolability of the composition and adhesion improving substances, for example, gamma-aminopropyltriethoxysilane. Suitable co-catalysts are known in the art and include the metal salts of carboxylic acids, for example, lead octoate and dibutyltin dilaurate, dibutyl tin diacetate, and stannous octoate. Ingredients used as a plasticizer or to reduce the modulus of the cured elastomer can be polydimethylsiloxane having terminal trioganosiloxy units where the organo groups are methyl, vinyl or phenyl or combinations of these groups. For example, the polydimethylsiloxanes used as plasticizers or modulus reducing agents can normally have a viscosity of from 100 to 100,000 mpa.s measured at 25° C. and can be used in amounts up to 80 parts by weight per 100 parts by weight of the polymeric material.

The compositions according to de Buyl et al are prepared by mixing the ingredients in any order and employing any suitable mixing equipment. Generally it is preferred to add the metallic compound after mixing together the polymeric material and the curative silane. Optional ingredients may be incorporated at any stage of the mixing operation but are preferably added after the catalyst. After mixing, the compositions can be stored under substantially anhydrous conditions, for example, in sealed containers until required for use. The compositions can be formulated as single part formulations which are stable in storage but cure on exposure to atmospheric moisture and may be employed as coatings, caulking materials and encapsulating materials. They are particularly suitable for sealing joints, cavities, and other spaces in articles and structures which are subject to relative movement. They are useful as glazing sealants and for sealing building structures. They can have cured properties with a modulus sufficiently low for most industry standards and an elongation at break which is sufficiently high for most industry standards.

de Buyl et al teach very useful compositions made using the metallic compound. However, there is a need to have a sealant which quickly develops green strength to allow the packaging and shipping of assembled components soon after they are manufactured. Many of the sealant compositions used in the past, such as those silicone sealant compositions which evolve acetic acid, ketoximes, or amines may cause corrosion of sensitive metals or plastics. These sealant compositions also typically have some unpleasant associated odor during the curing process, especially when used in confined areas where assemblies are manufactured, such as in buildings used to manufacture such assemblies, for example insulated glass window units. The use of compositions catalyzed by titanium compounds and liberating alcohols upon cure are considered to be less corrosive and emit a more pleasant odor during the curing process than those which give off acetic acid, ketoximes, or amines. However, alkoxy-functional silicone sealant compositions catalyzed with a titanium catalyst are known to be slow to cure, such as they are seldom found to have tack-free-times (TFT) of less than 20 minutes and often have time-to-rubber (TTR) of more than 30 minutes. Such properties clearly are not suitable to replace the previously used sealants in applications where manufacture requires the rapid assembly, packaging and shipping. The need is therefore to have sealant compositions which will quickly develop green strength for the purpose of maintaining the manufactured assembly's integrity, are less corrosive, do not yellow or otherwise discolor, and are compatible with more of the materials used in the construction of assemblies. In view of the discovery of the usefulness of the metallic compounds with bulky alkoxy groups to make RTV sealant compositions which cure fast and do not yellow, an investigation was undertaken to find a way to make sealant compositions which cure fast, quickly develop green strength, do not yellow, and are less corrosive. For the purposes of this invention, a composition which rapidly develops green strength is one which exhibits a fast-forming, high-modulus skin of sufficient strength such that elements of a construction can be formed and will maintain their desired configuration even if handled, packaged, and shipped after relatively short cure times, without showing permanent deformation.

SUMMARY OF THE INVENTION

It was discovered that there was a class of RTV sealant compositions which did provide the rapid development of green strength when cure was initiated, cured fast, did not yellow and were less corrosive. A class of RTV sealant compositions was discovered which used titanium compounds described by de Buyl et al. It is therefore an object of this invention to provide RTV compositions which are based on silicon-bonded alkoxy-functional containing compositions and which use the previously describe titanium catalyst of de Buyl et al.

This invention relates to a composition comprising the product obtained by mixing (A) a polymer which contains per molecule an average of at least 1.2

$$(RO)_{3-x}R^1_xSi—$$

chain terminations where each R is methyl or ethyl, each $R^1$ is methyl, ethyl, vinyl, and x has an average value of from 0 to 1 inclusive;

(B) a titanium catalyst of the average formula $$Ti(OR^2)_{(4-y)}(OR^3)_y$$

where each $R^2$ is selected from the group consisting of a monovalent tertiary aliphatic hydrocarbon radical and a monovalent branched-secondary aliphatic hydrocarbon radical, each $R^3$ is a monovalent linear aliphatic hydrocarbon radical having from 1 to 6 carbon atoms per radical, y has an average value of from 0 to 1 inclusive, (C) a filler having a hydroxyl group content derived from hydroxyl groups selected from the group consisting of covalent-bonded hydroxyl radicals, adsorbed water, or both the covalent-bonded hydroxyl radicals and the adsorbed water, and (D) an alkoxysilane of the average formula $$R^4_zSi(OR^5)_{4-z}$$

in which each $R^4$ is methyl, ethyl, or vinyl, each $R^5$ is methyl or ethyl, and z has an average value of from 1 to 2 inclusive, where each of ingredients (A), (B), (C), and (D) are present in amounts such that a molar ratio (I) is from 0.9 to 5 and a molar ratio (II) is from 0.6 to 2, where $$\text{molar ratio (I)} = \frac{\text{moles of titanium catalyst} + \text{moles of alkoxysilane}}{\text{moles of hydroxyl group in }(C)}$$

and $$\text{molar ratio (II)} = \frac{\text{moles of titanium catalyst}}{\text{moles of alkoxysilane} + \text{moles of silicon-bonded alkoxy unit chain terminations in }(A)}.$$

DETAILED DESCRIPTION OF THE PREFERRED EMBODIMENTS

The composition of this invention is an RTV sealant composition which comprises a polymer having at least 60 percent of the endgroups (chain terminations) with a silicon atom bearing at least two silicon-bonded alkoxy groups per endgroup, a crosslinker having at least two silicon-bonded alkoxy groups per molecule where the alkoxy is methoxy or ethoxy, a filler, a titanium catalyst for promoting room temperature cure of the silicone sealant composition where the titanium catalyst has an average formula $$Ti(OR^2)_{(4-y)}(OR^3)_y$$

and the ingredients are present in amounts such that they meet defined molar ratios (I) and (II). The ingredients and their amounts in accordance to the molar ratios will be described in further detail.

Polymer (A) can be represented by the general formula Y—B—Y where B may be any desired organic or siloxane molecular chain, for example, a polyoxyalkylene chain or a polydiorganosiloxane chain which includes siloxane units $R^9_sSiO_{(4-s)/2}$ in which $R^9$ represents an alkyl radical of from 1 to 6 inclusive carbon atoms per radical, phenyl, or a fluorinated alkyl radical, and s is 0, 1, or 2. The preferred polymers are polydiorganosiloxanes with siloxane units in which the average value of s is 2. These preferred polydiorganosiloxanes are represented by the general formula —$(R^9_2SiO)_t$— in which each $R^9$ represents methyl and t has a value of from 200 to 1500. At least 60 percent of the number of Y groups of the polymer is a silyl group which contains at least two silicon-bonded alkoxy groups. Those polymers which contain chain terminations other than those having silicon-bonded alkoxy groups are preferably triorganosilyl, such as trimethylsilyl, dimethylvinylsilyl, or methylphenylvinylsilyl units. Those silyl groups containing silicon-bonded alkoxy groups are illustrated by $$—SiR^1(OR)_2, —Si(OR)_3,$$

and $$—Si(R^1)_2—R^{11}—Si(R^1)_v(OR)_{(3-v)}$$

where $R^1$ is defined above and preferably is methyl, $R^{11}$ is a divalent hydrocarbon radical which may be interrupted by one or more siloxane spacers having up to six silicon atoms, R is methyl or ethyl and v is 0 or 1.

The polydiorganosiloxanes, as well as crosslinkers, fillers, and other optional ingredients useful in RTV silicone sealant compositions are well known in the art and are illustrated by Ceyzeriat et al in U.S. Pat. No. 3,151,099, issued Sep. 29, 1964; by Brown et al in U.S. Pat. No. 3,161,614, issued Dec. 15, 1964; by Weyenberg in U.S. Pat. No. 3,175,993, issued Mar. 30, 1965, and in U.S. Pat. No. 3,334,067, issued Aug. 1, 1967; by Klosowski et al in U.S. Pat. No. 4,871,827, issued Oct. 3, 1989; by Kamis et al in U.S. Pat. No. 4,898,910, issued Feb. 6, 1990; and by Chu et al in U.S. Pat. No. 4,956,435, issued Sep. 11, 1990, all of which are hereby incorporated by reference to show RTV silicone sealant composition ingredients and methods of their preparing RTV silicone sealant compositions. However, these prior art patent describe only some useful ingredients and those ingredients which are useful in this invention will be identified herein in the following description.

The polydiorganosiloxanes of RTV silicone sealant compositions are those polydiorganosiloxanes which have end-groups containing silicon atoms with at least two alkoxy groups per endgroup. These polydiorganosiloxanes include those in which the linkages between the silicon atoms of the polymer chain are oxygen atoms including the linkage to the chain terminating silyl unit. The polydiorganosiloxanes also include those polymers where the chain terminations contain at least one linkage of a divalent hydrocarbon radical between two silicon atoms. These types of polydiorganosiloxanes are known in the art as is described herein. The polydiorganosiloxanes can be mixtures of polymers, for example, mixtures of the polydiorganosiloxanes having one endgroup as a triorganosiloxy unit such as trimethylsiloxy or vinyldimethylsiloxy and the other endgroup is a silicon-bonded alkoxy containing unit and where in such mixtures there is an average per molecule of at least 1.2 alkoxy-containing silyl chain terminations, preferably there is an average of at least 1.5 alkoxy-containing silyl chain terminations per molecule. In these mixtures, 40 percent or less of the total endgroups are triorganosiloxy, preferably less than 25 percent of the endgroups are triorganosiloxy. The preferred endgroups are trimethylsilyl and dimethylvinylsilyl and are preferably present in less than 25 percent of the total endgroups. The alkoxy groups are methoxy or ethoxy.

The polydiorganosiloxanes having endgroups containing silicon atoms with at least two silicon-bonded alkoxy groups per silicon endgroup and where the silicon atoms of the polymer chain are linked by oxygen atoms are exemplified by the disclosures of Brown et al and can be illustrated by the general average formula

and by mixtures of the polydiorganosiloxanes of formula (I) and polydiorganosiloxanes of the following general average formula

In the above formulae, R is methyl or ethyl, $R^2$ is methyl, ethyl, or vinyl; $R^9$ is an alkyl radical of 1 to 6 inclusive carbon atoms, phenyl, or a fluorinated alkyl radical; g has an average value of 2 to 3 inclusive, f has an average value of at least 200. The preferred polydiorganosiloxanes of this kind are the polydimethylsiloxanes, and especially those with viscosities at 25° C. of from 5 Pa.s to 150 Pa.s.

The polydiorganosiloxanes of (A) with end segments containing linkages of divalent hydrocarbon radicals between some of the silicon atoms of the polymer chain include those described by Weyenberg in U.S. Pat. No. 3,175,993, issued Mar. 30, 1965, by Klosowski et al in U.S. Pat. No. 4,871,827, issued Oct. 3, 1989, and by Kamis et al in U.S. Pat. No. 4,898,910, issued Feb. 6, 1990, which are hereby incorporated by reference to show the polydiorganosiloxanes having end segments with at least one divalent hydrocarbon radical linkage between polymer-chain silicon atoms and their methods of preparation. Such polydiorganosiloxanes can be illustrated by the following general average formula

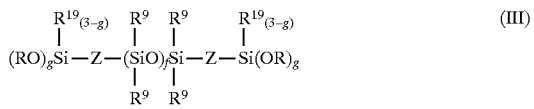

where R, $R^9$, g, and f are described above, $R^{19}$ is methyl, ethyl, and Z is a divalent hydrocarbon radical or a combination of divalent hydrocarbon radicals and siloxane segments of 2 to 7 silicon atoms. The divalent hydrocarbon radicals are those having from 2 to 18 inclusive carbon atoms and are illustrated by ethylene, propylene, butylene, pentylene, and hexylene, preferably ethylene. Where Z is a combination of divalent hydrocarbon radicals and siloxane segments, the polydiorganosiloxanes with end segments containing divalent hydrocarbon linkages and divalent siloxane segments interrupting at least divalent hydrocarbon linkages between the polymer chain silicon atoms, have end segments which, as Z, have the following general average formula

where c has an average value of 1 to 6 inclusive, $R^{19}$ is defined above, and G is a divalent hydrocarbon radical free of aliphatic unsaturation of 2 to 18 carbon atoms.

These polydiorganosiloxanes can be prepared by reacting a hydrogen endblocked polydiorganosiloxane with a silane having an alkenyl radical in the presence of a hydrosilylation catalyst such as a platinum compound or complex or a polydiorganosiloxane having alkenyl endgroups, such as vinyl, are reacted, in the presence of a platinum catalyst, with an endcapping silicon-containing group which has silicon-bonded hydrogen atoms. If one uses a silane of the following general average formula one will make a polydiorganosiloxane as described in Weyenberg's U.S. Pat. No. 3,175,993,

where e is 1 to 16, d is 0 or 1, and R, $R^2$, $R^{19}$, and g are defined above. If one uses an endcapper, such as of the following general average formula, those polydiorganosiloxanes described by Klosowski et al and Kamis et al can be produced,

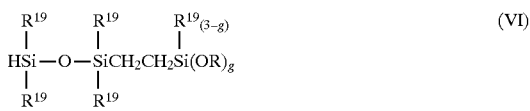

where R, $R^{19}$, and g are defined above. The preferred polydiorganosiloxanes of this kind are those described by Klosowski et al and Kamis et al where the divalent hydrocarbon radical is ethylene and have a viscosity at 25° C. of 5 to 150 Pa.s. Kamis et al describe useful polymers for (A) in which have both vinyl containing endgroups and endgroups as described for the polymers of formula (III). Such polymers are mixtures of at least two kinds of polymers where one kind of polymer has alkoxy functional groups on both end and another kind of polymer has alkoxy functional groups on one end and vinyl on the other end. These polymers are represented by the following general average formula:

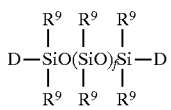

where $R^9$ methyl or ethyl, each D is selected from the group consisting of vinyl and a radical of the general average formula

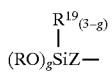

where each $R^{19}$ is methyl or ethyl and g has an average value of 2 to 3 inclusive. In these polymers, when some D are vinyl, there is 40 percent or less of the total endgroups with vinyl, preferably less than 25 percent of the total endgroups with vinyl.

Polymer (A) includes organic polymers with polyalkoxyfunctional silicon-containing chain terminations as described herein. One particular class of such polymers is the polyoxyalkylene, such as described by Okawa et al in U.S. Pat. No. 5,403,881, issued Apr. 4, 1995, and hereby incorporated by reference to show the polyoxyalkylene polymers with polyalkoxysilyl endgroups. These polymers described by Okawa et al are polyoxyalkylenes with a molecular weight of 500 to 16,000, whose main chain has units with the formula —$R^{18}$O— in which $R^{18}$ is an alkylene group having 1 to 4 carbon atoms, and the chain termination segments have a general average formula

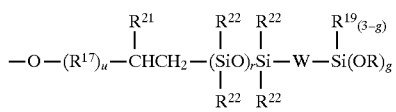

in which R, $R^{19}$ and g are defined above, $R^{17}$ is a divalent hydrocarbon group, $R^{21}$ is hydrogen atom or a monovalent hydrocarbon group, $R^{22}$ is a monovalent hydrocarbon group, W is a divalent organic group, r is zero or a positive value, preferably r is a number with a value of at least 1, and u is 0 or 1. $R^{18}$ is a $C_1$-$C_4$ alkylene group and is exemplified by methylene, ethylene, 1-methylethylene, 1-ethylethylene, and 1,1-dimethyl-ethylene. $R^{17}$ in the preceding formula is a divalent hydrocarbon group and is exemplified by methylene, ethylene, propylene, and butylene. $R^{21}$ is the hydrogen atom or a monovalent hydrocarbon group, and the latter is exemplified by alkyl groups such as methyl, ethyl, and propyl; cycloalkyl groups such as cyclohexyl; aryl groups such as phenyl, tolyl, and xylyl; and aralkyl groups such as benzyl and phenethyl. $R^{22}$ in each case is a monovalent hydrocarbon group as defined for $R^{21}$. The group W in the preceding formula is a divalent organic group and is exemplified by methylene, ethylene, propylene, butylene, phenylene, and substituted phenylene.

The polyoxyalkylenes of Okawa et al can be synthesized by an addition reaction between SiH-containing organosiloxane with the following general average formula

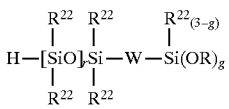

wherein $R^{22}$, R, $R^{19}$, W, g, and r are defined as above, and polyoxyalkylene (molecular weight=400 to 15,000) that contains in each molecule in molecular chain terminal position at least 1.1 unsaturated groups with the formula

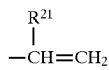

wherein $R^{21}$ is defined as above.

Titanium catalyst (B) has the average formula

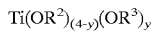

where each $R^2$ is selected from the group consisting of a monovalent tertiary aliphatic hydrocarbon radical and a monovalent branched-secondary aliphatic hydrocarbon radical, each $R^3$ is a monovalent linear aliphatic hydrocarbon radical having from 1 to 6 carbon atoms per radical, y has an average value of from 0 to 1 inclusive. These titanium catalysts (B) useful for this invention, for the most, are described in the application by de Buyl et al which is incorporated by reference and cited earlier in this document. Preferably, there are several $R^2$ groups in each molecule. The $OR^2$ group is derived from a tertiary or branched-secondary alcohol, such as $HOCH(CH_3)CH_2CH(CH_3)_2$. Preferred $R^2$ are those represented by the general formula —$CR^6R^7R^8$ in which each $R^6$, $R^7$, and $R^8$ is a monovalent aliphatic hydrocarbon radical having from 1 to 6 inclusive carbon atoms per radical. The most preferred titanium compounds are those in which y has an average value of from 0 to 1 inclusive, and all the $R^2$ groups are tertiary aliphatic groups. A preferred group of titanium catalysts are those represented by the general formula

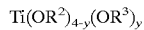

where $R^2$ is —$C(CH_3)_3$ or —$C(C_2H_5)(CH_3)_2$ and $R^3$ is isopropyl. The most preferred titanium catalysts are those in which $R^2$ is —$C(CH_3)_3$ or —$C(CH_3)_2(CH_2CH_3)$ and y is zero. The titanium catalyst (B) is present in the RTV sealant composition in amounts such that molar ratio (I) is 0.9 to 5, preferably 1 to 2.5 and molar ratio (II) is 0.6 to 2, preferably 0.8 to 1. The moles of titanium catalyst present in the RTV sealant composition is a significant factor for both molar ratios. Molar ratio (I) is the sum of the moles of titanium catalyst (B) plus the moles of the alkoxysilane (D) divided by the moles of hydroxyl group in (C) and the molar ratio (II) is the moles of titanium catalyst (B) divided by the sum of the moles of alkoxysilane (D) plus the moles of silicon-bonded alkoxy unit chain terminations in (A). Thus, the amount of the titanium catalyst (B) is a significant factor in determining molar ratios (I) and (II) because the moles of the titanium catalyst appears in the numerator of both ratios. Therefore, increasing the amount of titanium catalyst increases the molar ratios if the other ingredients remain constant. Because the titanium catalyst can be expensive, small amounts of the catalyst are desirable. Smaller amounts of titanium catalyst (B) are also preferred because the RTV sealant compositions of this invention have better hydrolytic stability. High amounts of titanium catalyst show poorer hydrolytic stability because at increased titanium catalyst concentrations, the amount of Ti—O—Si bonds increase and these bonds are susceptible to cleavage under wet conditions. However, molar ratio (I) and molar ratio (II) need to meet their defined parameters to have acceptable shelf-stability based on molar ratio (I), and rapid development of green strength based on molar ratio (II). For this invention, shelf-stability means in-container stability. The uncured composition maintains its rheology during storage and when cured, the properties are essentially the same over the storage period, i.e. from time of manufacture to point of exposure to moisture and cure. The amount of titanium catalyst for curing the RTV sealant composition is often present such that there is from 0.1 to 5 weight percent based on the total weight of the RTV sealant composition. The titanium catalysts (B) can be prepared by reacting tetrachlorotitanium or a tetraalkoxytitanium such as tetraisopropoxytitanium with a selected branched-secondary or tertiary alcohol, for example tertiary-butanol or tertiary-amyl alcohol. Such reactions by-produce hydrochloric acid or an alcohol, such as isopropanol which are preferably removed from the reaction medium to obtain desired titanium catalysts (B). In the alkoxy exchange method, the starting tetraalkoxytitanium is preferably selected to ensure easy removal of the by-produced alcohol by vacuum devolatilization. Thus, the by-produced alcohol should have a boiling point which permits its easy removal from the reaction mixture without interfering with the preparation of titanium catalyst (B). Accordingly, not all alkoxytitanates are suitable for use in the preparation of titanium catalyst (B) because of the closeness of the boiling points of the reacting alcohol and the by-produced alcohol. For example, the boiling points of isopropanol (iPrOH), tertiary-butanol (t-BuOH), tertiary-amyl alcohol, and n-butanol are 82° C., 83° C., 102° C., and 118° C. respectively. Reaction of tertiary-amyl alcohol favorably replaces the alkoxy groups on tetra-isopropyltitanate (TiPT), tetra-ethyltitanate, and tetra-methyltitanate to produce tetra-tertiary-amyl titanate. The replacement reaction is favored when reacting tertiary-butanol with tetra-methyltitanate to produce tetra-tertiary-butyltitanate, but not with the other alkoxytitanates. The reaction between tertiary-butanol and tetra-isopropyl titanate can be used to produce titanium catalysts (B) where all the isopropoxy groups (—OiPr) of the tetra-isopropyl titanate are not replaced by the tertiary-butoxy groups (—OtBu). The particular reaction may be illustrated as follows:

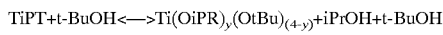

$$TiPT + t\text{-}BuOH \longleftrightarrow Ti(OiPR)_y(OtBu)_{(4-y)} + iPrOH + t\text{-}BuOH$$

where the value of y has an average of 0 to 1 inclusive and is preferably less than 0.85 to provide more desirable results, such as faster cure rates than those with higher y values. More preferred titanium catalysts (B) where both isopropoxy and tertiary-butoxy groups are present on the titanium atom are those which have a y value of less than 0.6.

Conventional titanium catalysts for promoting the curing of the prior art alkoxy-containing RTV silicone sealant compositions are those as described by Ceyzeriat et al, Brown et al, and Weyenberg. Those titanium catalysts include tetraalkoxytitanates, or chelated titanium compounds, examples of which include tetraethyl titanate, tetraisopropyl titanate, tetra-n-propyl titanate, tetrabutyl titanate, bis-acetylacetonyldiisopropyl titanate, 2,5-diisopropyl-bis-ethylacetoacetate titanium, and 1,3-dioxypropane-titanium-bis(ethylacetoacetate) where the latter is described by Beers et al in U.S. Pat. No. 4,722,967, issued Feb. 2, 1988. Those titanium catalysts described by Ceyzeriat et al, Brown et al, Weyenberg, and Beers et al are not useful in the RTV sealant compositions of this invention.

The RTV sealant compositions also comprise a filler, (C), which is selected from those known to be useful in RTV sealants. These fillers include calcium carbonate both ground, precipitated, and colloidal calcium carbonates which are untreated or treated with stearate, crushed quartz, ground quartz, alumina, aluminum hydroxide, titanium dioxide, diatomaceous earth, reinforcing silicas such as fumed silicas, precipitated silicas, and hydrophobed reinforcing silicas, iron oxide, carbon black, graphite, and the like. The amount of filler is that amount of filler which provides the desired properties to the uncured composition such as viscosity, thixotropy, pigmentation, UV protection, and the like. The amount of filler used in the RTV sealant compositions also depends upon the cured physical properties desired such as tensile strength, elongation, and durometer. The amount of filler is preferably from 5 to 50 weight percent based on the total weight of the RTV silicone sealant composition. The amount of filler allowable also depends upon hydroxyl content of the filler. The hydroxyl content is derived from hydroxyl groups covalently bonded to the filler and adsorbed water. Covalently bonded hydroxyl to be included in the hydroxyl content are those covalent hydroxyl groups which are available for reaction and would exclude those which might be hidden within a filler particle and thus unavailable for reaction. The hydroxyl content also includes adsorbed water which is available for reaction. Absorbed water would include associated water on the filler surface and water which becomes available from within the filler to be available for reaction. The amount of filler permitted is that amount needed to provide molar ratio (I) to be 0.9 to 5, and preferably 1 to 2.5. Molar ratio (I) is obtained by taking the sum of the moles of titanium catalyst (B) and the moles of alkoxysilane (D) and dividing by the moles of hydroxyl group in filler (C). The equation for the molar ratio (I) is shown heretofore. A particular filler may only have adsorbed water available for reaction and may not have any covalently bonded hydroxyl groups available for reaction. However, many fillers have both the covalently bonded hydroxyl groups and adsorbed water available for reaction, for example untreated fumed silica filler. The hydroxyl content available for reaction can be altered by drying the filler and/or pretreating the filler with hydrophobing agents which react with covalent-bonded hydroxyl groups and adsorbed water, such as hexamethyldisilazane and the like which are well known in the art. Calcium carbonate fillers are often treated with stearic acid to reduce the hydroxyl content, such treated fillers as the silicas and the calcium carbonates are available commercially. It is preferred to use fillers which have a low hydroxyl content, however practical considerations find that fillers have some hydroxyl content and it is very expensive to eliminate all hydroxyl content, therefore from a practical standpoint all fillers will have some available-for-reaction hydroxyl content. The use of fillers with low hydroxyl content can reduce the cost by minimizing the amount of titanium catalyst (B), as required to meet molar ratios (I) and (II) needed to provide the fast development of green strength, as can be observed by the short times-to-rubber (TTR). The amount of polymer (A) can also be reduced. Improvement of adhesion for RTV sealant to polyvinylchloride can be obtained by using calcium carbonate filler. Blends of reinforcing fumed silica filler and ground calcium carbonate provide a useful filler mixture with a low hydroxyl content while maintaining excellent uncured and cured RTV sealant properties. It is believed that RTV sealant compositions which have a molar ratio (I) of 0.9 to 5 exhibit shelf-stability. By the term "shelf-stability" in this application, it means that an RTV sealant composition when packaged will maintain its uncured properties during the expected storage period as observed when prepared and that the cured properties will be essentially the same when cured shortly after preparation as after a storage period. Because the moles of hydroxyl group in filler (C) is in the denominator of molar ratio (I), one finds that using fillers with lower hydroxyl content permits the use of combinations of titanium catalyst (B) and alkoxysilane (D) at lower amounts in the RTV sealant composition to achieve the essentially the same uncured, curing, and cured characteristics and properties as at higher amounts of titanium catalyst (B) and alkoxysilane (D).

The crosslinkers (D) for the RTV sealant compositions are alkoxysilanes which have at least two alkoxy groups per molecule wherein the alkoxy groups are either methoxy or ethoxy. These alkoxysilanes preferably contain three alkoxy groups per molecule, and are illustrated by methyltrimethoxysilane, methyltriethoxysilane, vinyltrimethoxysilane, vinyltriethoxysilane, ethyltrimethoxysilane, ethyltriethoxysilane, mixtures of these alkoxysilanes and their partial hydrolyzates. Preferably, the alkoxysilanes are methyltrimethoxysilane or mixtures with other alkoxysilanes wherein methyltrimethoxysilane comprises a majority of the alkoxysilanes in the mixture. Because the polymers used in the RTV compositions of this invention have at least two alkoxy groups in the alkoxy-containing silyl chain terminations, the crosslinker can also be one which has two silicon-bonded alkoxy groups per molecule, such as dimethyldimethoxysilane, methylvinyldimethoxysilane, dimethyldiethoxysilane, and methylethyldiethoxysilane. The amount of alkoxysilane crosslinker can be those amounts which do not take molar ratio (I) and molar ratio (II) outside the limits where molar ratio (I) is 0.9 to 5, preferably 1 to 2.5, and molar ratio (II) is 0.6 to 2, preferably 0.8 to 1. In meeting these molar ratios, the weight percentages of crosslinker is often found to be in the range of from 0.1 to 10 weight percent based on the total weight of the RTV sealant composition, more preferred from 0.1 to 3 weight percent. Increasing the amount of alkoxysilane (D) decreases the rate of development of green strength and slows the cure rate. For a preferred group of RTV sealant compositions, the use of less than 1.5 weight percent based on the total weight of the composition exhibits desirable green strength development rates.

Other ingredients which are conventionally used in RTV sealant compositions such as adhesion promoters, fungicides, colorants, pigments, plasticizers, and the like, can be added as long as they do not interfere with the rapid development of green strength, discoloration of the uncured composition or cured product, by deteriorating the curing properties, by deteriorating the cured physical properties, or reducing the effective bonding between the cured sealant and the substrates. Where organo-functional trialkoxysilanes are used as adhesion promoters and their amounts are such that the moles of organo-functional trialkoxysilane may be significant with respect to the moles of alkoxysilane crosslinker (D), it may be desirable to include the moles of such adhesion promoter as part of the moles of alkoxysilane in determining molar ratios (I) and (II).

The RTV sealant compositions of this invention when the molar ratios I and II are met, rapidly develop green strength as observed by lap shear values after 30 minutes of curing of at least 2700 pascal (Pa), with preferred lap shears of at least 5400 Pa. The time-to-rubber (TTR) should also be less than 10 minutes. These RTV sealant compositions do not yellow and are less corrosive to many substrates.

This invention is further illustrated by the following examples which are presented for that purpose and is not intended to limit the scope of the invention which is properly delineated by the claims. In the example, "part" or "parts" refer to part by weight or parts by weight (expressed as "pbw"), viscosities were measured at 25° C. Me represents methyl, t-Bu represents tertiary-butyl, and iPr represents isopropyl.

INGREDIENTS USED IN THE EXAMPLES

Polymer 1=a mixture of polydimethylsiloxanes where one kind of polymer had a formula

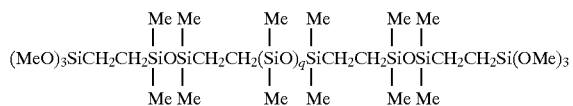

and another kind of polymer had a formula

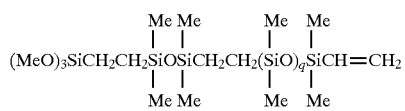

where the polymer mixture contained 20 percent of the endgroups as vinyl and q had an average value such that the viscosity was 60 Pa.s. Some small fraction of a polymer where both ends are vinyl may be present as a by-product from the preparation.

Polymer 2=a polydimethylsiloxane having the following formula

where q has an average value such that the viscosity was 12.5 Pa.s.

Polymer 3=a polydimethylsiloxane having the following formula

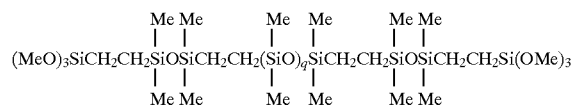

where q had an average value such that the viscosity was 10 Pa.s.

Polymer 4=a polydimethylsiloxane having the following formula

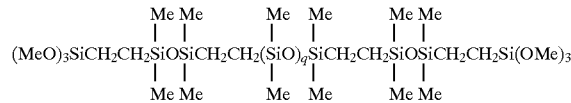

where q had an average value such that the viscosity was 60 Pa.s.

Polymer 5=a polydimethylsiloxane having the following formula

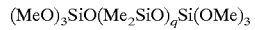

where q had an average value such that the viscosity was 20 Pa.s.

Polymer 6=a polydimethylsiloxane blend of Polymer 3 and Polymer 4 having a viscosity of 20 Pa.s.

Polymer 7=a polydimethylsiloxane having the following formula

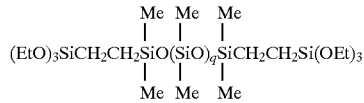

where q had an average value such that the viscosity was 20 Pa.s.

Catalyst 1=a mixture of titanium molecules having an average formula

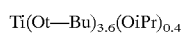

Catalyst 2=Ti(OiPr)$_4$

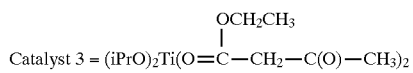

Catalyst 3 = (iPrO)$_2$Ti(O=C(OCH$_2$CH$_3$)—CH$_2$—C(O)—CH$_3$)$_2$

Alkoxysilane 1=methyltrimethoxysilane
Alkoxysilane 2=dimethyldimethoxysilane
Silica Filler=fumed silica filler having a surface area of 150 m$^2$/g and a water content of 1.0 weight percent
G. CaCO$_3$=a ground calcium carbonate having an average particle size of 2–3 micrometers, surface treated with stearic acid, and contains 0.1 weight percent adsorbed water
ppt CaCO$_3$=a precipitated calcium carbonate having a surface area of about 22 m$^2$/g, surface treated with stearic acid and an adsorbed water content of 0.4 weight percent

GREEN STRENGTH MEASUREMENT BY LAP SHEAR

Aluminum panels measuring 2.54 cm×7.62 cm were assembled into lap shear joints with a 2.54 cm overlap. The glue line thickness was 0.254 cm. Samples were allowed to cure for 30 minutes by exposure to atmospheric conditions which were 25° C. and 50% relative humidity and then the green strength values were obtained. The values were obtained by using an Instron Tensile Tester at a pull rate of 1.27 cm per minute. The results were obtained in pound per square inch (psi) which was converted to pascals.

EXTRUSION RATE

The extrusion rate was determined by test procedure MIL—S— 8802D on the uncured RTV silicone sealant composition by extruding it through a nozzle with a 0.3175 cm orifice using a 620.5 kPa pressure and measuring the amount extruded in grams per minute (g/min).

TIME-TO-RUBBER (TTR)

The time-to-rubber (TTR) is that time from the point of exposure of an RTV sealant composition to atmospheric conditions of 50% relative humidity and 25° C. to the point where an elastic skin forms on the surface of the exposed composition. When the surface of the curing RTV sealant composition can be deformed approximately 0.635 cm and show elastic recovery without cracking, splitting, or pulling away from the uncured composition, the surface has reached the time-to-rubber (TTR) or an elastic skin point. The TTR is reported in minutes.

EXAMPLES 1–5

In each of the RTV sealant compositions where the ingredients were as described in Table I, were made by mixing under conditions to exclude moisture where the ingredients were mixed by first adding alkoxysilane and titanium catalyst to the polymer, adding filler, mixing, and drawing a vacuum to remove any by-produced alcohol. In Table I, the moles of groups and ingredients were based on 100 grams of the RTV sealant composition and appear in Table I in parenthesis below the weight parts. Molar ratios (I) and (II) as defined in this document, were as shown in Table I and were determined using the shown moles. The RTV sealant compositions were stored in containers sealed to prevent atmospheric moisture from entering. Testing was done after two days storage at 25° C. The extrusion rate in grams/minute (g/m) for each of the RTV sealant compositions was measured and were as shown Table I. The TTR and the green strength (lap shear) for each of the RTV sealant compositions were measured and the values were as shown in Table I. Three lap shear panels were averaged and reported as the green strength in each of the examples in Table I. Example 4 illustrates the usefulness of diorganodialkoxysilanes as a crosslinker.

Comparative Examples 2, 3, and 5 each had a molar ratio (II) of less than 0.6 and exhibit unacceptable green strengths of less than 2700 Pa and unacceptable TTR of greater than 10 minutes. Comparative Examples 2 and 3 showed that even if the amount of titanium catalyst resulted in molar ratio (I) within the acceptable range of 0.9 to 5, but was calculated using moles of titanium catalyst other than the titanium catalyst of this invention, the green strength values and the TTR values were not acceptable. Also, molar ratio (II) for Comparative Examples 2 and 3 were zero because the titanium catalysts were not the titanium catalyst of the present invention, and as a result the green strength values and the TTR values were not acceptable.

EXAMPLES 6–10

RTV sealant compositions were prepared and tested in the same manner as Examples 1–5, the ingredients, their amounts, and the properties measured were as shown in Table II. Example 6 showed the usefulness of silica per se as a filler and Example 7 showed the usefulness of ground calcium carbonate per se as a filler.

Comparative Example 8 had a molar ratio (I) value of less than 0.9 and had an unacceptable extrusion rate of 5 g/min and Comparative Example 9 had a molar ratio (II) of less than 0.6 and exhibited an unacceptable green strength of less than 2700 Pa and an unacceptable TTR of greater than 10 minutes. Comparative Example 10 showed that acceptable green strength values and TTR values were obtainable using a precipitated calcium carbonate.

EXAMPLES 11–16

RTV sealant compositions were prepared and tested as described for Examples 1–5, except that the ingredients and their amounts were as shown in Table III. The results of the testing were as shown in Table III.

Examples 1 and 11–16 illustrated that a variety of polymers with polyalkoxy-functional chain terminations resulted in RTV sealant compositions with acceptable green strength values and acceptable TTR values when molar ratio (I) had a value of 0.9 to 5 and molar ratio (II) had values of 0.6 to 2.

EXAMPLES 17–19

RTV sealant compositions were prepared and tested in the same manner as Examples 1–5, the ingredients, their amounts, and the properties measured were as shown in Table IV.

Examples 1 and 17–19 showed that the addition of a rheology additive, an adhesion promoter, or a combination of these additives provided acceptable green strength values and TTR values.

EXAMPLES 20 and 21

RTV sealant compositions were prepared and tested in the same manner as Examples 1–5, the ingredients, their amounts, and the properties measured were as shown in Table V. In Table V, TES represents tetraethoxysilane.

Comparative Examples 20 and 21 showed that the substitution of tetraalkoxysilane for an alkyltrialkoxysilane resulted in a low value for green strength for Example 20 and both a low value for green strength and a long TTR value for Example 21. It was concluded that tetraalkoxysilanes were not useful in this invention.

TABLE I

| INGREDIENT | EXAMPLE | | | | |
|---|---|---|---|---|---|
| | 1 | 2* | 3* | 4 | 5* |
| POLYMER 1, pbw | 49.05 | 49.35 | 48.60 | 48.84 | 47.70 |
| (moles alkoxy Si end) | (0.00128) | (0.00129) | (0.00127) | (0.00127) | (0.00124) |
| CATALYST 1, pbw | 1.80 | 0.0 | 0.0 | 1.80 | 1.80 |
| (moles cat.) | (0.00529) | (0.0) | (0.0) | (0.00529) | (0.00529) |
| CATALYST 2, pbw | 0.0 | 1.50 | 0.0 | 0.0 | 0.0 |
| (moles cat.) | (0.0) | (0.00528) | (0.0) | (0.0) | (0.0) |
| CATALYST 3, pbw | 0.0 | 0.0 | 2.25 | 0.0 | 0.0 |
| (moles cat.) | (0.0) | (0.0) | (0.00531) | (0.0) | (0.0) |
| ALKOXYSILANE 1, pbw | 0.65 | 0.65 | 0.65 | 0.0 | 2.0 |
| (moles silane) | (0.00478) | (0.00478) | (0.00478) | (0.0) | (0.01470) |
| ALKOXYSILANE 2, pbw | 0.0 | 0.0 | 0.0 | 0.86 | 0.0 |
| (moles silane) | (0.0) | (0.0) | (0.0) | (0.00717) | (0.0) |
| SILICA FILLER, pbw | 3.5 | 3.5 | 3.5 | 3.5 | 3.5 |
| (moles OH) | (0.00385) | (0.00385) | (0.00385) | (0.00385) | (0.00385) |
| G. CaCO3, pbw | 45.0 | 45.0 | 45.0 | 45.0 | 45.0 |
| (moles OH) | (0.005) | (0.005) | (0.005) | (0.005) | (0.005) |
| MOLAR RATIO (I) | 1.14 | 1.14** | 1.14** | 1.41 | 2.26 |
| MOLAR RATIO (II) | 0.87 | 0.00 | 0.00 | 0.63 | 0.33 |
| EXTRUSION RATE (g/min) | 54 | 25 | 55 | 40 | 40 |
| GREEN STRENGTH, Pa | 5516 | 689 | 689 | 4137 | 1379 |
| TTR, minutes | 4 | 12 | 30 | 5 | 20 |

*Comparative Example
**These values for molar ratio (I) include moles of titanium Catalyst 2 and moles of titanium Catalyst 3 which were not within the scope of the titanium catalyst of the present invention.

TABLE II

| INGREDIENT | EXAMPLE | | | | | |
|---|---|---|---|---|---|---|
| | 1 | 6 | 7 | 8* | 9* | 10 |
| POLYMER 1, pbw | 49.05 | 89.55 | 47.55 | 62.55 | 61.20 | 61.10 |
| (moles alkoxy Si end) | (0.00128) | (0.00233) | (0.00124) | (0.00163) | (0.00160) | (0.00159) |
| CATALYST 1, pbw | 1.80 | 1.80 | 1.80 | 1.80 | 1.80 | 2.80 |
| (moles cat.) | (0.00529) | (0.00529) | (0.00529) | (0.00529) | (0.00529) | (0.00824) |
| ALKOXYSILANE 1, pbw | 0.65 | 0.65 | 0.65 | 0.65 | 2.0 | 1.10 |
| (moles silane) | (0.00478) | (0.00478) | (0.00478) | (0.00478) | (0.01470) | (0.00809) |
| SILICA FILLER, pbw | 3.5 | 8.0 | 0.0 | 0.0 | 0.0 | 0.0 |
| (moles OH) | (0.00385) | (0.00880) | (0.0) | (0.0) | (0.0) | (0.0) |
| G. CaCO3, pbw | 45.0 | 0..0 | s0.0 | 0.0 | 0.0 | 0.0 |
| (moles OH) | (0.005) | (0.0) | (0.00556) | (0.0) | (0.0) | (0.0) |
| ppt. CaCO3, pbw | 0.0 | 0.0 | 0.0 | 35.0 | 35.0 | 35.0 |
| (moles OH) | (0.0) | (0.0) | (0.0) | (0.0156) | (0.0156) | (0.0156) |
| MOLAR RATIO (I) | 1.14 | 1.14 | 1.81 | 0.65 | 1.29 | 1.05 |
| MOLAR RATIO (II) | 0.87 | 0.74 | 0.88 | 0.83 | 0.32 | 0.85 |
| EXTRUSION RATE (g/min) | 54 | 36 | 116 | 5 | 95 | 57 |
| GREEN STRENGTH, Pa | 5516 | 2758 | 6895 | 6895 | 689 | 12411 |
| TTR, minutes | 4 | 3 | 2 | 4 | 20 | 3 |

*Comparative Example

TABLE III

| INGREDIENT | 1 | 11 | 12 | 13 | 14 | 15 | 16 |
|---|---|---|---|---|---|---|---|
| POLYMER 1, pbw | 49.05 | 0.0 | 0.0 | 0.0 | 0.0 | 0.0 | 0.0 |
| (moles alkoxy silyl ends) | (0.00128) | (0.0) | (0.0) | (0.0) | (0.0) | (0.0) | (0.0) |
| POLYMER 2, pbw | 0.0 | 49.05 | 0.0 | 0.0 | 0.0 | 0.0 | 0.0 |
| (moles alkoxy silyl ends) | (0.0) | (0.00273) | (0.0) | (0.0) | (0.0) | (0.0) | (0.0) |
| POLYMER 3, pbw | 0.0 | 0.0 | 47.60 | 0.0 | 0.0 | 0.0 | 0.0 |
| (moles alkoxy silyl ends) | (0.0) | (0.0) | (0.00273) | (0.0) | (0.0) | (0.0) | (0.0) |
| POLYMER 4, pbw | 0.0 | 0.0 | 0.0 | 47.60 | 0.0 | 0.0 | 0.0 |
| (moles alkoxy silyl ends) | (0.0) | (0.0) | (0.0) | (0.00155) | (0.0) | (0.0) | (0.0) |
| POLYMER 5, pbw | 0.0 | 0.0 | 0.0 | 0.0 | 47.60 | 0.0 | 0.0 |
| (moles alkoxy silyl ends) | (0.0) | (0.0) | (0.0) | (0.0) | (0.00194) | (0.0) | (0.0) |
| POLYMER 6, pbw | 0.0 | 0.0 | 0.0 | 0.0 | 0.(5 | 47.60 | 0.0 |
| (moles alkoxy silyl ends) | (0.0) | (0.0) | (0.0) | (0.0) | (0.0) | (0.00207) | (0.0) |
| POLYMER 7, pbw | 0.0 | 0.0 | 0.0 | 0.0 | 0.0 | 0.0 | 47.60 |
| (moles alkoxy silyl ends) | (0.0) | (0.0) | (0.0) | (0.0) | (0.0) | (0.0) | (0.00194) |
| CATALYST 1, pbw | 1.80 | 1.80 | 1.80 | 1.80 | 1.80 | 1.80 | 1.80 |
| (moles cat.) | (0.00529) | (0.00529) | (0.00529) | (0.00529) | (0.00529) | (0.00529) | (0.00539) |
| ALKOXY-SILANE 1, pbw | 0.65 | 0.65 | 0.60 | 0.60 | 0.60 | 0.60 | 0.60 |
| (moles silane) | (0.00478) | (0.00478) | (0.00441) | (0.00441) | (0.00441) | (0.00441) | (0.00441) |
| SILICA FILLER, pbw | 3.5 | 3.5 | 4.0 | 4.0 | 4.0 | 4.0 | 4.0 |
| (moles OH) | (0.00385) | (0.00385) | (0.00440) | (0.00440) | (0.00440) | (0.00440) | (0.00440) |
| G. CaCO3, pbw | 45.0 | 45.0 | 45.0 | 45.0 | 45.0 | 45.0 | 45.0 |
| (moles OH) | (0.005) | (0.005) | (0.005) | (0.005) | (0.005) | (0.005) | (0.005) |
| RHEOLOGY ADDITIVE, pbw | 0.0 | 0.0 | 0.5 | 0.5 | 0.5 | 0.5 | 0.5 |
| ADHESION PROMOTER, pbw | 0.0 | 0.0 | 0.5 | 0.5 | 0.5 | 0.5 | 0.5 |
| MOLAR RATIO (I) | 1.14 | 1.14 | 1.03 | 1.03 | 1.03 | 1.03 | 1.03 |
| MOLAR RATIO (II) | 0.87 | 0.71 | 0.74 | 0.89 | 0.83 | 0.82 | 0.83 |
| EXTRUSION RATE (g/min) | 54 | 318 | | | | | |
| GREEN STRENGTH, Pa | 5516 | 7584 | 7584 | 11032 | 11721 | 8274 | 5516 |
| TTR, minutes | 4 | 3 | 6 | 3 | 3 | 4 | 8 |

TABLE IV

| INGREDIENT | 1 | 17 | 18 | 19 |
|---|---|---|---|---|
| POLYMER 1, pbw | 49.05 | 48.55 | 48.55 | 48.05 |
| (moles alkoxy Si end) | (0.00128) | (0.00127) | (0.00127) | (0.00125) |
| CATALYST 1, pbw | 1.80 | 1.80 | 1.80 | 1.80 |
| (moles cat.) | (0.00529) | (0.00529) | (0.00529) | (0.00529) |
| ALKOXYSILANE 1, pbw | 0.65 | 0.65 | 0.65 | 0.65 |
| (moles silane) | (0.00478) | (0.00478) | (0.00478) | (0.00478) |
| SILICA FILLER, pbw | 3.5 | 3.5 | 3.5 | 3.5 |
| (moles OH) | (0.00385) | (0.00385) | (0.00385) | (0.00385) |
| G. CaCO3, pbw | 45.0 | 45.0 | 45.0 | 45.0 |
| (moles OH) | (0.005) | (0.005) | (0.005) | (0.005) |
| ppt. CaCO3, pbw | 0.0 | 0.0 | 0.0 | 0.0 |
| (moles OH) | (0.0) | (0.0) | (0.0) | (0.0) |
| RHEOLOGY ADDITIVE, pbw | 0.0 | 0.5 | 0.0 | 0.5 |
| ADHESION PROMOTER, pbw | 0.0 | 0.0 | 0.5 | 0.5 |
| MOLAR RATIO (I) | 1.14 | 1.14 | 1.14 | 1.14 |
| MOLAR RATIO (II) | 0.87 | 0.88 | 0.88 | 0.88 |
| EXTRUSION RATE (g/min) | 54 | 56 | 66 | 57 |
| GREEN STRENGTH, Pa | 5516 | 6895 | 4137 | 4137 |
| TTR, minutes | 4 | 4 | 5 | 7 |

TABLE V

| INGREDIENT | 1 | 20* | 21* |
|---|---|---|---|
| POLYMER 1, pbw | 49.05 | 48.70 | 48.40 |
| (moles alkoxy Si end) | (0.00128) | (0.00127) | (0.00126) |
| CATALYST 1, pbw | 1.80 | 1.80 | 1.80 |
| (moles cat.) | (0.00529) | (0.00529) | (0.00529) |
| TES, pbw | 0.65 | 1.00 | 1.30 |
| (moles silane) | (0.00478) | (0.00481) | (0.00625) |
| SILICA FILLER, pbw | 3.5 | 3.5 | 3.5 |
| (moles OH) | (0.00385) | (0.00385) | (0.00385) |
| G. CaCO3, pbw | 45.0 | 45.0 | 45.0 |
| (moles OH) | (0.005) | (0.005) | (0.005) |
| MOLAR RATIO (I) | 1.14 | 1.14 | 1.30 |
| MOLAR RATIO (II) | 0.87 | 0.87 | 0.70 |

TABLE V-continued

| INGREDIENT | EXAMPLE | | |
|---|---|---|---|
| | 1 | 20* | 21* |
| EXTRUSION RATE (g/min) | 54 | 41 | 65 |
| GREEN STRENGTH, Pa | 5516 | 1379 | 689 |
| TTR, minutes | 4 | 7 | 21 |

*Comparative example

That which is claimed is:

1. A composition comprising the product obtained by mixing (A) a polymer which contains per molecule an average of at least 1.2

$$(RO)_{(3-x)}R^1{}_xSi—$$

chain terminations where each R is methyl or ethyl, each $R^1$ is methyl, ethyl, or vinyl, and x has an average value of from 0 to 1 inclusive;

(B) a titanium catalyst of the average formula $$Ti(OR^2)_{(4-y)}(OR^3)_y$$

where each $R^2$ is selected from the group consisting of a monovalent tertiary aliphatic hydrocarbon radical and a monovalent branched-secondary aliphatic hydrocarbon radical, each $R^3$ is a monovalent linear aliphatic hydrocarbon radical having from 1 to 6 carbon atoms per radical, y has an average value of from 0 to 1 inclusive, (C) a filler having a hydroxyl group content derived from hydroxyl groups selected from the group consisting of covalent-bonded hydroxyl radicals, adsorbed water, or both the covalent-bonded hydroxyl radicals and the adsorbed water, and (D) an alkoxysilane of the average formula $$R^4{}_zSi(OR^5)_{(4-z)}$$

in which each R4 is methyl, ethyl, or vinyl, each $R^5$ is methyl or ethyl, and z has an average value of from 1 to 2 inclusive, where each of ingredients (A), (B), (C), and (D) are present in amounts such that a molar ratio (I) is 0.9 to 5 and a molar ratio (II) is 0.6 to 2, where $$\text{molar ratio (I)} = \frac{\text{moles of titanium catalyst} + \text{moles of alkoxysilane}}{\text{moles of hydroxyl group in } (C)}$$

and $$\text{molar ratio (II)} = \frac{\text{moles of titanium catalyst}}{\text{moles of alkoxysilane} + \text{moles of silicon-bonded alkoxy unit chain terminations in } (A)}.$$

2. The composition according to claim 1 in which molar ratio (I) is 1 to 2.5 and molar ratio (II) is 0.8 to 1.

3. The composition according to claim 1 in which $R^2$ is tertiary-butyl and $R^3$ is isopropyl.

4. The composition according to claim 2 in which $R^2$ is tertiary-butyl and $R^3$ is isopropyl.

5. The composition according to claim 1 in which the polymer of (A) is a polydiorganosiloxane of the general average formula

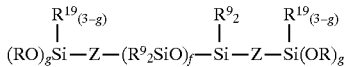

where R is methyl or ethyl; $R^9$ is methyl, ethyl, or phenyl; $R^{19}$ is methyl or ethyl; g has an average value of 2 to 3 inclusive; f is at least 200; and Z is a divalent hydrocarbon radical free of aliphatic unsaturation of 2 to 18 carbon atoms or a divalent group of the general average formula

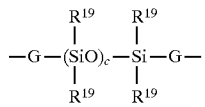

where $R^{19}$ is defined above, G is a divalent hydrocarbon radical free of aliphatic unsaturation of 2 to 18 carbon atoms, and c has an average value from 1 to 6 inclusive.

6. The composition according to claim 2 in which the polymer of (A) is a polydiorganosiloxane of the general average formula

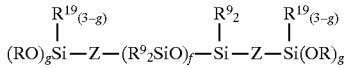

where R is methyl or ethyl; $R^9$ is methyl, ethyl, or phenyl; $R^{19}$ is methyl or ethyl; g has an average value of 2 to 3 inclusive; f is at least 200; and Z is a divalent hydrocarbon radical free of aliphatic unsaturation of 2 to 18 carbon atoms or a divalent

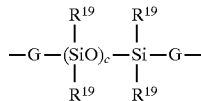

where $R^{19}$ is defined above, G is a divalent hydrocarbon radical free of aliphatic unsaturation of 2 to 18 carbon atoms, and c has an average value from 1 to 6 inclusive.

7. The composition according to claim 3 in which the polymer of (A) is a polydiorganosiloxane of the general average formula

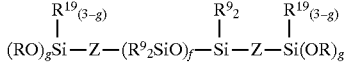

where R is methyl or ethyl; $R^9$ is methyl, ethyl, or phenyl; $R^{19}$ is methyl or ethyl; g has an average value of 2 to 3 inclusive; f is at least 200; and Z is a divalent hydrocarbon radical free of aliphatic unsaturation of 2 to 18 carbon atoms or a divalent group of the general average formula

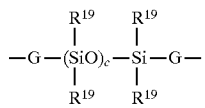

where $R^{19}$ is defined above, G is a divalent hydrocarbon radical free of aliphatic unsaturation of 2 to 18 carbon atoms, and c has an average value from 1 to 6 inclusive.

8. The composition according to claim 4 in which the polymer of (A) is a polydiorganosiloxane of the general average formula

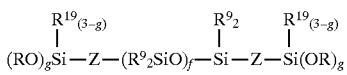

where R is methyl or ethyl; $R^9$ is methyl, ethyl, or phenyl; $R^{19}$ is methyl or ethyl; g has an average value of 2 to 3 inclusive; f is at least 200; and Z is a divalent hydrocarbon radical free of aliphatic unsaturation of 2 to 18 carbon atoms or a divalent group of the general general formula

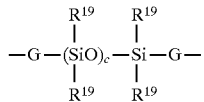

where $R^{19}$ is defined above, G is a divalent hydrocarbon radical free of aliphatic unsaturation of 2 to 18 carbon atoms, and c has an average value from 1 to 6 inclusive.

9. The composition according to claim 5 in which R is methyl, $R^9$ is methyl, and (D) is methyltrimethoxysilane.

10. The composition according to claim 1 in which the polymer of (A) is a polydiorganosiloxane of the general average formula

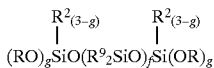

or a mixture of the polydiorganosiloxane of formula (I) and polydiorganosiloxanes of the following general average formula

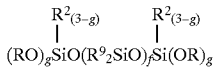

in which R is methyl or ethyl, $R^2$ is methyl, ethyl, or vinyl; $R^9$ is an alkyl radical of 1 to 6 inclusive carbon atoms, phenyl, or a fluorinated alkyl radical; g has an average value of 2 to 3 inclusive, f has an average value of at least 200.

11. The composition according to claim 2 in which the polymer of (A) is a polydiorganosiloxane of the general average formula

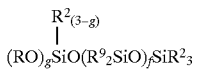

or a mixture of the polydiorganosiloxane of formula (I) and polydiorganosiloxanes of the following general average formula

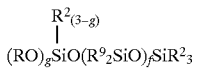

in which R is methyl or ethyl, $R^2$ is methyl, ethyl, or vinyl; $R^9$ is an alkyl radical of 1 to 6 inclusive carbon atoms, phenyl, or a fluorinated alkyl radical; g has an average value of 2 to 3 inclusive, f has an average value of at least 200.

12. The composition according to claim 3 in which the polymer of (A) is a polydiorganosiloxane of the general average formula

or a mixture of the polydiorganosiloxane of formula (I) and polydiorganosiloxanes of the following general average formula

in which R is methyl or ethyl, $R^2$ is methyl, ethyl, or vinyl; R9 is an alkyl radical of 1 to 6 inclusive carbon atoms, phenyl, or a fluorinated alkyl radical; g has an average value of 2 to 3 inclusive, f has an average value of at least 200.

13. The composition according to claim 4 in which the polymer of (A) is a polydiorganosiloxane of the general average formula

or a mixture of the polydiorganosiloxane of formula (I) and polydiorganosiloxanes of the following general average formula

in which R is methyl or ethyl, $R^2$ is methyl, ethyl, or vinyl; $R^9$ is an alkyl radical of 1 to 6 inclusive carbon atoms, phenyl, or a fluorinated alkyl radical; g has an average value of 2 to 3 inclusive, f has an average value of at least 200.

14. The composition according to claim 13 in which R is methyl, $R^9$ is methyl, and (D) is methyltrimethoxysilane.

15. The composition according to claim 5 in which Z is ethylene, R is methyl, $R^9$ is methyl, $R^{19}$ is methyl, and g has an average value of 2.

16. The composition according to claim 5 in which Z is ethylene, R is ethyl, and g has an average value of 3.

17. The composition according to claim 5 in which Z is ethylene, R is methyl, and g has an average value of 3.

18. The composition according to claim 1 in which (C) is a reinforcing silica filler.

19. The composition according to claim 1 in which (C) is calcium carbonate.

20. The composition according to claim 1 in which (C) is a combination of reinforcing silica filler and ground calcium carbonate.

* * * * *